United States Patent

Yumiba et al.

[11] Patent Number: 5,470,678
[45] Date of Patent: Nov. 28, 1995

[54] LITHIUM CELL WITH A CATHODE COMPRISING A COPPER COMPOUND OXIDE

[75] Inventors: Hideaki Yumiba, Suita; Kazunobu Matsumoto, Mishima; Akira Kawakami, Takatsuki, all of Japan

[73] Assignee: Hitachi Maxell, Ltd., Osaka, Japan

[21] Appl. No.: 105,169

[22] Filed: Aug. 12, 1993

[30] Foreign Application Priority Data

Aug. 19, 1992 [JP] Japan ............................. 4-244280

[51] Int. Cl.⁶ ............................ H01M 6/16; H01M 4/58
[52] U.S. Cl. ............................................. 429/194; 429/220
[58] Field of Search .................................... 429/220, 194

[56] References Cited

U.S. PATENT DOCUMENTS

| 4,608,324 | 8/1986 | Fujii et al. ............... 429/220 X |
| 4,939,049 | 7/1990 | Ishibashi et al. ......... 429/220 X |

FOREIGN PATENT DOCUMENTS

| 0021358 | 1/1981 | European Pat. Off. . |
| 0162923 | 12/1985 | European Pat. Off. . |
| 53-010026 | 1/1978 | Japan . |
| 57-034670 | 6/1982 | Japan . |
| 61-206169 | 9/1986 | Japan . |
| 2042250 | 9/1980 | United Kingdom ............ 429/220 |
| 2065957 | 7/1981 | United Kingdom . |

OTHER PUBLICATIONS

Journal of the Electrochemical Society, vol. 137, No. 1, 1 Jan. 1990, pp. 5C–22C.
Journal of the Electrochemical Society, vol. 135, No. 1, 1 Jan. 1988 pp. 32–36.
European Search Report, Nov. 1993.
Broussely M., Jumel Y. and Gabano J. P. (Oct. 1977), 152nd Electrochemical Society Mtg., Atlanta (Abst. #9, pp. 33–34).

*Primary Examiner*—John S. Maples
*Attorney, Agent, or Firm*—Birch, Stewart, Kolasch & Birch

[57] ABSTRACT

There is provided a lithium cell comprising a negative electrode made of lithium or a lithium containing material, an electrolytic solution based on an organic solvent, and a positive electrode active material which comprises a copper compound oxide and an atomic ratio of a number of lithium atoms (Li) which react with one molecule of the copper compound oxide during discharge of the lithium cell to a number of oxygen atoms (O) contained in one molecule of the copper compound oxide, which ratio is expressed as Li/O, is at least 1.

3 Claims, 5 Drawing Sheets

LITHIUM CELL WITH A CATHODE COMPRISING A COPPER COMPOUND OXIDE

BACKGROUND OF THE INVENTION

1. Field of the Invention

The present invention relates to a lithium cell. Particularly, the present invention relates to improvement of a positive electrode active material of the lithium cell.

2. Description of the Related Art

A lithium cell in which copper oxide is used as a positive electrode active material (hereinafter, sometimes referred to as "Li/CuO" for abbreviation) has been heretofore proposed as a large capacity density lithium cell. For example, reference can be made to Broussely M., Jumel Y. and Gabano J. P. (1977) 152nd Electrochemical Society Meeting, Atlanta (Abstract No. 9 (p. 33)).

However, the closed circuit voltage of the above Li/CuO is as low as about 1.5 V.

SUMMARY OF THE INVENTION

It is, therefore, an object of the present invention to provide a lithium cell which has a high voltage and a large capacity density.

According to the present invention, the above object has been achieved by using, as a main component of a positive electrode active material in a lithium cell, a copper compound oxide such as a compound comprising copper, tellurium and oxygen as the main component elements. Namely, there is provided a lithium cell comprising a negative electrode made of lithium or a lithium containing material, an electrolytic solution based on an organic solvent, and a positive electrode active material which comprises a copper compound oxide. The copper compound oxide may comprise, in place of or in addition to tellurium, other elements such as Ti, W, Mo, Mg and Ge.

DETAILED DESCRIPTION OF THE INVENTION

Figure 1:
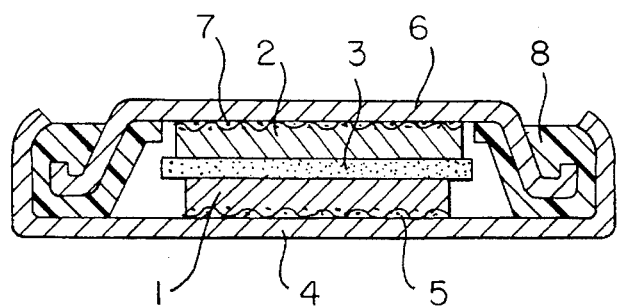
FIG. 1 schematically shows a cross sectional view of an embodiment of a coin-shaped lithium cell according to the present invention.

Preferable examples of the compound comprising copper, tellurium and oxygen as the main component elements are $Cu_3TeO_6$, $CuTeO_3$, $CuTeO_5$, $CuTeO_4$ and so on.

In a preferred embodiment of the present invention, $Cu_3TeO_6$ is used as a main component of the positive electrode active material of the lithium cell.

The reasons why the lithium cell of the present invention has a large density capacity is not necessarily clear. However, not being bound by any theory, it is possible to suggest an explanation using as below as an example $Cu_3TeO_6$, selected from the above compounds.

A discharge reaction in a lithium cell in which lithium is used as a negative electrode material and $Cu_3TeO_6$ is used as a positive electrode active material (hereinafter, sometimes referred to as "Li/$Cu_3TeO_6$" for abbreviation) proceeds according to a following reaction equation:

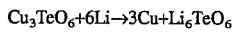

$$Cu_3TeO_6 + 6Li \rightarrow 3Cu + Li_6TeO_6$$

According to the above discharge equation, the number of lithium atoms (Li) to be reacted is six per six oxygen atoms.

The volume of oxide material to be used as the positive electrode active material depends mainly on the volume occupied by oxygen atoms, and thus the number of oxygen atoms (O). The discharge capacity is determined mainly by the number of lithium atoms (Li) which are to be reacted.

Therefore, a ratio of the number of lithium atoms to the number of oxygen atoms, namely Li/O can be used as a measure of predicting whether or not the capacity density of the lithium cell is large.

Heretofore, $Cu_4O(PO_4)_2$ has been proposed for the use as a positive electrode active material so as to produce a lithium cell which can provide a voltage as high as about 2.0–2.5 V. In this case using $Cu_4O(PO_4)_2$, the ratio of Li/O is 8/9.

To the contrary, $Cu_3TeO_6$, which is used according to the present invention has a Li/O ratio of 6/6, namely Li/O=1, which is larger than the ratio in the case of $Cu_4O(PO_4)_2$. Therefore, it can be qualitatively understood that the $Cu_3TeO_6$ cell, according to the present invention, has a larger capacity than the conventional $Cu_4O(PO_4)_2$ cell.

Although tellurium belongs to the VI b group of the Periodic Table and is positioned below selenium, its toxicity is less than that of selenium and thus hexavalent tellurium ($Te^{6+}$) is safe to use.

Since tellurium has a large atomic weight, $Cu_3TeO_6$ has a very large density as much as 6.34 g/cc, among the oxides. Thus, when $Cu_3TeO_6$ is compared with $Cu_4O(PO_4)_2$, while there is no large difference between them in capacity density per unit weight (mAh/g), $Cu_3TeO_6$ can provide a larger capacity density per unit volume (mAh/cc). Therefore, the use of $Cu_3TeO_6$ is very advantageous in making a lithium cell having a large capacity in which the inner volume is limited, as in the case of a coin-shaped cell or a cylinder-shaped cell. Especially, for the use in a cell in which the inner volume is not larger than 5 cc, it is preferred to use a compound having a large density above 6 g/cc, such as $Cu_3TeO_6$.

Thus, in a preferred embodiment of the present invention, the ratio of Li/O of the copper oxide compound is equal to or larger than 1 on the basis of the above consideration of $Cu_3TeO_6$ which provides the larger capacity density per unit volume (mAh/cc).

The compound which is used in the positive electrode active material according to the present invention preferably comprises copper, tellurium and oxygen as the main component elements. Namely, the compound may consist essentially of copper, tellurium and oxygen or may include, in addition to copper, tellurium and oxygen, any suitable additional element in a small amount.

Among the compounds comprising copper, tellurium and oxygen as the main component elements, the compound having an atomic ratio (copper:tellurium:oxygen) of 3:1:6, namely $Cu_3TeO_6$, is especially preferred since its Li/O ratio is larger than any other copper-tellurium compound oxide and it is safe for use by humans.

In the lithium cell using the copper compound oxide, the discharge voltage (closed circuit voltage) is lowered during the initial period of the discharge. After about 10% of its discharge capacity has been discharged, the cell recovers its inherent discharge voltage.

The reason why the discharge voltage is lowered during the initial period of the discharge is not clear. However, it is speculated that almost no electron conductivity of the copper compound oxide such as $Cu_3TeO_6$ may play a role.

It has been found that lowering of the discharge voltage is overcome by adding to the positive electrode active material comprising the copper compound oxide, a positive electrode active material for a lithium secondary cell having an electric potential higher by at least 2 V above that of lithium.

Thus, in another aspect of the present invention, there is provided a secondary lithium cell comprising the copper compound oxide as the positive electrode active material, characterized in that the positive electrode active material for the lithium secondary cell has an electric potential higher by at least 2 V than that of lithium. The addition of the positive electrode active material for the lithium secondary cell having an electric potential higher by at least 2 V than that of lithium is applicable not only to the lithium cell comprising the copper compound oxide having the ratio of Li/O of at least 1, but also to a lithium cell comprising the copper oxide compound having the ratio of Li/O of less than 1.

When lithium is used as the negative electrode material and $Cu_3TeO_6$ is used as the positive electrode active material so that the lithium cell ($Cu_3TeO_6$/Li) is formed and then the cell is discharged, the discharge voltage is about 2 V in a flat discharge voltage region. However, the discharge voltage is lowered to near 1.7 V during the initial discharge period. Such discharge voltage lowering occurs again once the discharge is stopped and the discharge is re-started, even when the flat discharge voltage region has already been reached before the discharge stop.

A compound which has an electric potential higher by 2.5–1.8 V above lithium such as $TiS_2$ (titanium disulfate), and which can be charged and discharged is added to $Cu_3TeO_6$. The resultant mixture is used as the positive electrode active material so that the lithium cell is formed, the other conditions being the same as the above lithium cell which has the lowering of the discharge voltage. When the cell thus formed is discharged, the lowering of the discharge voltage is suppressed since $TiS_2$ discharges during the lowering of the initial discharge voltage period of the $Cu_3TeO_6$-cell ($Cu_3TeO_6$/Li). When the inherent discharge voltage of the $Cu_3TeO_6$-cell is recovered, $TiS_2$ which has discharged is charged to about 2.0 V.

As a result, even when the discharge is re-started after the discharge has stopped, the discharge voltage lowering at the beginning is suppressed since $TiS_2$ which has been previously charged discharges again when the discharge voltage of $Cu_3TeO_6$ is lowered.

When the truly lowering of the initial discharge voltage is only suppressed, the positive electrode active material to be added is not necessarily required to be chargeable. Considering prevention of the lowering of the discharge voltage after the discharge is once stopped and the discharge is re-started, the positive electrode active material to be added is required to be the chargeable material for the positive electrode active material of the secondary cell.

In the present invention, as the positive electrode active material having an electric potential higher by at least 2 V above lithium for the lithium secondary cell which is added to the copper compound oxide such as $Cu_3TeO_6$, in addition to or instead of $TiS_2$, chalcogenides such as $MoS_2$, $VSe$, $MoS_3$, $Fe0.25V0.75S2$ and $NbSe_3$, lithium compound oxides such as $Li_2MoO_3$ and $LiMn_3O_6$, $V_6O_{13}$, amorphous $V_2O_5$ and any combination thereof may be used depending on the positive electrode active material used in the cell and an object of the cell. Particularly, the chalcogenides are preferred since each has a higher electron conductive capability.

Reasons why the positive electrode active material for the lithium secondary cell which is to be added to the copper compound oxide such as $Cu_3TeO_6$ is required to have the electric potential larger by at least 2 V above that of lithium is that the discharge voltage during the initial period of the discharge is lowered to about 1.7 V which value may be slightly changed depending on the kind of the copper compound oxide and the discharge conditions, and such voltage lowering has to be compensated for until the flat voltage (of about 2 V) period is reached. It can be clearly seen also from such reasons that the positive electrode active materials to be added for the lithium secondary cell are preferably those having a large capacity in a range of the electric potential of from 1.7–2.0 V above lithium.

An amount of the positive electrode active material for the secondary lithium cell having the electric potential larger by at least 2 V above lithium which is to be added to the copper compound oxide such as $Cu_3TeO_6$ is not specifically limited. However, it is preferable that a content of the positive electrode active material for the secondary lithium cell having the electric potential larger by at least 2 V above lithium is 2 to 30% by weight based on the total weight of the positive electrode active material comprising the copper compound oxide such as $Cu_3TeO_6$, and the positive electrode active material for the secondary lithium cell, namely:

$$\frac{\text{(Positive electrode active material for secondary lithium cell)}}{\text{(Cu}_3\text{TeO}_6 + \text{Positive electrode active material for secondary lithium cell)}} = 2\text{–}30\% \text{ by weight}$$

As to the discharge capacity, $Cu_3TeO_6$ has a theoretical discharge capacity of 388 mAh/g while $TiS_2$ has a theoretical discharge capacity of 240 mAh/g. Thus, based on a unit weight of the active material, $Cu_3TeO_6$ is about 1.6 times as large as that of $TiS_2$. By mixing the positive electrode active material for the lithium secondary cell having the electric potential larger by at least 2 V above lithium, the above effect is provided.

Examples of the copper compound oxide used as the positive electrode active material of the lithium cell according to the present invention in which the effect of the addition of the positive electrode active material for the secondary lithium cell is obtained are, in addition to Cu—Te compound oxides such as $Cu_3TeO_6$ described above, $CuGeO_3$, $Cu_2GeO_4$, $Cu_3B_2O_6$, $Cu_2P_2O_7$, $Cu_3P_2O_8$, $Cu_4P_2O_9$, $Cu_5P_2O_{10}$, $Cu_2V_2O_7$, $Cu_3WO_6$, $Cu_3TiO_5$ and $Cu_2MgO_3$. Each oxide has a specific electric potential and a specific discharge capacity, and selection of the oxide depends on the purpose of the cell.

A positive electrode according to the present invention is produced by mixing the copper compound oxide as discussed above and the positive electrode active material for the secondary lithium cell having the electric potential larger by at least 2 V above lithium, and optionally an electron conductive aid such as acetylene black, and a binder such as a polytetrafluoroethylene, to produce a resultant mixture as a positive electrode composition, and forming the mixture into the positive electrode using conventional means. When a material having electron conductivity, for example TiS2 and MoS2, is added, the addition of the electron conductive aid may be omitted.

As the negative electrode in the cell according to the present invention, lithium, a lithium alloy such as lithium-aluminum alloy or a lithium containing material such as a lithium-carbon mixture may be used depending on the purpose of the cell.

As an electrolytic solution of the cell according to the present invention, at least one electrolyte such as $LiCF_3SO_3$, $LiClO_4$, $LiPF_6$ $LiBF_4$ and $LiC_4F_9SO_3$ dissolved in an organic solvent such as 1,2-dimethoxyethane, 1,2-diethoxyethane, propylene carbonate, ethylene carbonate, γ-butyrolactone, tetrahydrofuran, 1,3-dioxolan or diethyl carbonate or a mixture thereof, may be used depending on the purpose of the cell.

The present invention will be, hereinafter, explained in detail with reference thereto. However, the present invention is not limited to the Examples.

PREFERRED EMBODIMENTS

Example 1

$Cu_3TeO_6$ was synthesized in following two different manners:

Copper oxide (CuO) and telluric acid ($H_6TeO_6$) were mixed in a molar ratio of 3:1 (=CuO: $H_6TeO_6$) to have a resultant mixture, and the mixture was heated in a air to 700° C. for 36 hours to have a material colored pale yellow-green.

The prepared material was in a form of a particle having an average particle size of about 1 μm and identified as $Cu_3TeO_6$ with an X-ray powder diffractometer using Cu—Kα. A diffraction pattern was obtained using an X-ray source under conditions of an applied voltage 50 kV and a current of 150 mA and 2θ was in a range of 10° to 100°. The diffraction curve thus obtained is shown in an upper side of FIG. 2.

Copper carbonate ($CuCO_3.Cu(OH)_2. H_2O$) was used in place of copper oxide and reacted with telluric acid ($H_6TeO_6$) in the above synthesis, so that a material colored pale yellow-green as described above was produced. The material was identified as $Cu_3TeO_6$ by the powder X-ray diffractometer as described above. The diffraction curve of $Cu_3TeO_6$ originated from copper carbonate is also shown in a lower side of FIG. 2.

Figure 2:
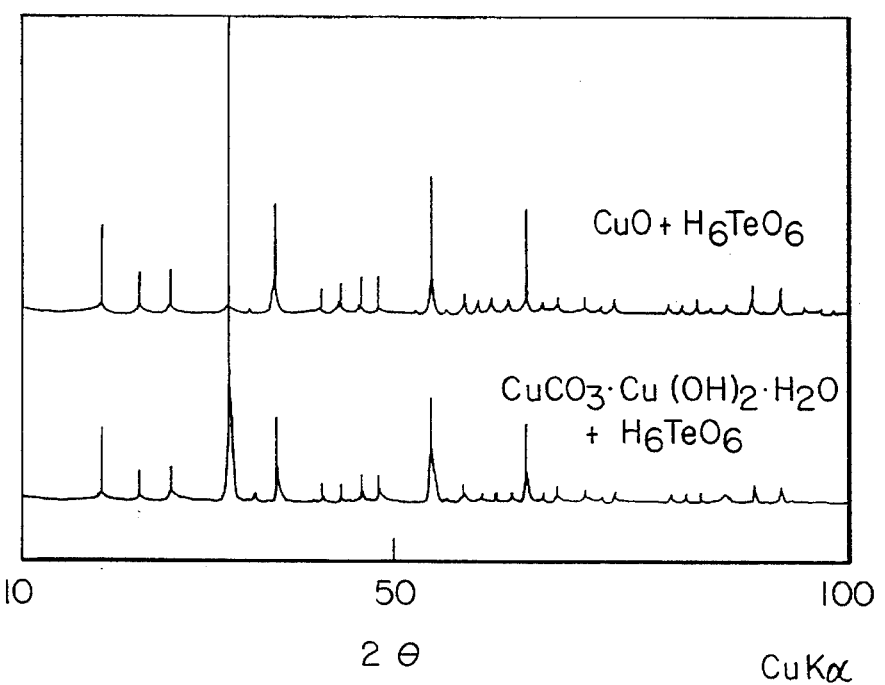
FIG. 2 shows X-ray diffraction patterns of $Cu_3TeO_6$ separately produced in a different manner which is used in the positive electrode active material of the present invention.

It is clearly seen from FIG. 2 that the material produced from copper oxide (CuO) as the starting material and the material produced from copper carbonate ($CuCO_3.Cu(OH)_2.H_2O$) as the starting material have substantially the same peaks each other while intensity ratios of some peaks are different, and that both materials are $Cu_3TeO_6$.

A positive electrode active main material was prepared by mixing 95% by weight of $Cu_3TeO_6$ thus prepared as a main component and 3.5% by weight of $CuGeO_3$, 0.5% by weight of $Cu_3WO_6$, 0.5% by weight of $Cu_3TiO_5$ and 0.5% by weight of $Cu_2MgO_3$ as sub-components. An additive material was prepared by mixing 90% by weight of $TiS_2$ as a main component and 5% by weight of each $MoS_2$ and $LiMn_3O_6$. Then, a positive electrode active material was prepared by mixing 85% by weight of the positive electrode active main material and 15% by weight of the additive material to have a positive electrode active material according to the present invention.

A mixture of flake graphite and acetylene black of which weight ratio of 1:1 as an electron conductive aid and a polytetrafluoroethylene as a binder (commercially available from Mitsui-Dupont under a trade name of Teflon-6J) was added to the positive electrode active material thus obtained (weight ratio of the positive electrode active material:the mixture of the flake graphite and the acetylene black:the polytetrafluoroethylene was 80:18:2) so that a positive electrode composition was prepared. The composition of the positive electrode active material are shown in below Table 1.

TABLE 1

| Composition of Positive Electrode Active Material | | |
|---|---|---|
| | Preferable Mixing Ratio of Positive Active Main Material and Additive Material | Component (% by weight in each material) |
| Positive Active Main Material | 85 wt %–100 wt % | $Cu_3TeO_6$ (95) |
| | | $CuGeO_3$ (3.5) |
| | | $Cu_3WO_6$ (0.5) |
| | | $Cu_3TiO_5$ (0.5) |
| | | $Cu_2MgO_3$ (0.5) |
| Additive Material | 15 wt %–0 wt % | $TiS_2$ (90) |
| | | $MoS_2$ (5) |
| | | $LiMn_3O_6$ (5) |

60 Grams of the positive electrode composition was charged in a mold, press-molded into a disc having a diameter of 10 mm and a density of about 4 g/cm³ under a pressure of 1 ton/cm² and then thermally treated at a temperature of 250° C. for 4 hours in an atmosphere of mixture gas of Ar/$O_2$ (having a volume ratio of 80/20) so that a positive electrode was formed. Using the positive electrode thus formed, a coin (or button)-shaped lithium cell according to the present invention was produced as shown in FIG. 1.

In FIG. 1, the numeral 1 indicates the positive electrode formed as the above, and 2 does a disc-shaped negative electrode made of lithium having a diameter of 14 mm. The numeral 3 indicates a separator made of a polypropylene non-woven fabric, 4 does a positive electrode can made of a stainless steel, 5 does a positive electrode collector made of a stainless steel mesh, and 6 does a negative electrode can made of a stainless steel having a surface plating of nickel.

The numeral 7 indicates a negative electrode collector made of a stainless steel mesh which is spot-welded to an inner surface of the negative electrode can 6. The negative electrode 2 is press-bonded to the negative electrode collector 7. The numeral 8 indicates a gasket in an annular form made of a polypropylene. The cell was filled with an electrolytic solution consisting essentially of a mixture solvent of ethylene carbonate and 1,2-dimethoxyethane having a volume ratio of 1:1 to which $LiCF_3SO_3$ and $LiClO_4$ were added in ratios of 0.5 mol/l and 0.1 mol/l, respectively. An amount of the electrolytic solution filled in the cell was so selected that a ratio of a volume of the electrolytic solution (μl) to the discharge capacity of the positive electrode active material (mAh) corresponds to 0.9.

Example 2

A lithium cell was prepared in the same manner as in Example 1 except that the positive electrode active material consisted of 95% by weight of the positive electrode active main material of Table 1 and 5% by weight of the additive material of Table 1, in place of 85% by weight and 15% by weight in Example 1, respectively.

Example 3

A lithium cell was prepared in the same manner as in Example 1 except that no additive material as shown in Table 1 was added to the positive electrode active main material of Table 1.

Comparative Example 1

A lithium cell was prepared in the same manner as in Example 1 except that copper oxide (CuO) was used as the positive electrode active material.

Comparative Example 2

A lithium cell was prepared in the same manner as in Example 1 except that $Cu_4O(PO_4)_2$ was used as the positive electrode active material.

Discharge properties of the cells produced in Example 1 to 3 and Comparative Examples 1 and 2 were measured by discharging the cells at a discharge current of 0.85 mA, respectively. Discharge curves of the cells are shown in FIGS. 3, 4, 5 and 6. In the graphs shown in FIGS. 3 to 6, the ordinate indicates a voltage (V) and the abscissae indicates a capacity density per unit weight (mAh/g).

Figure 3:
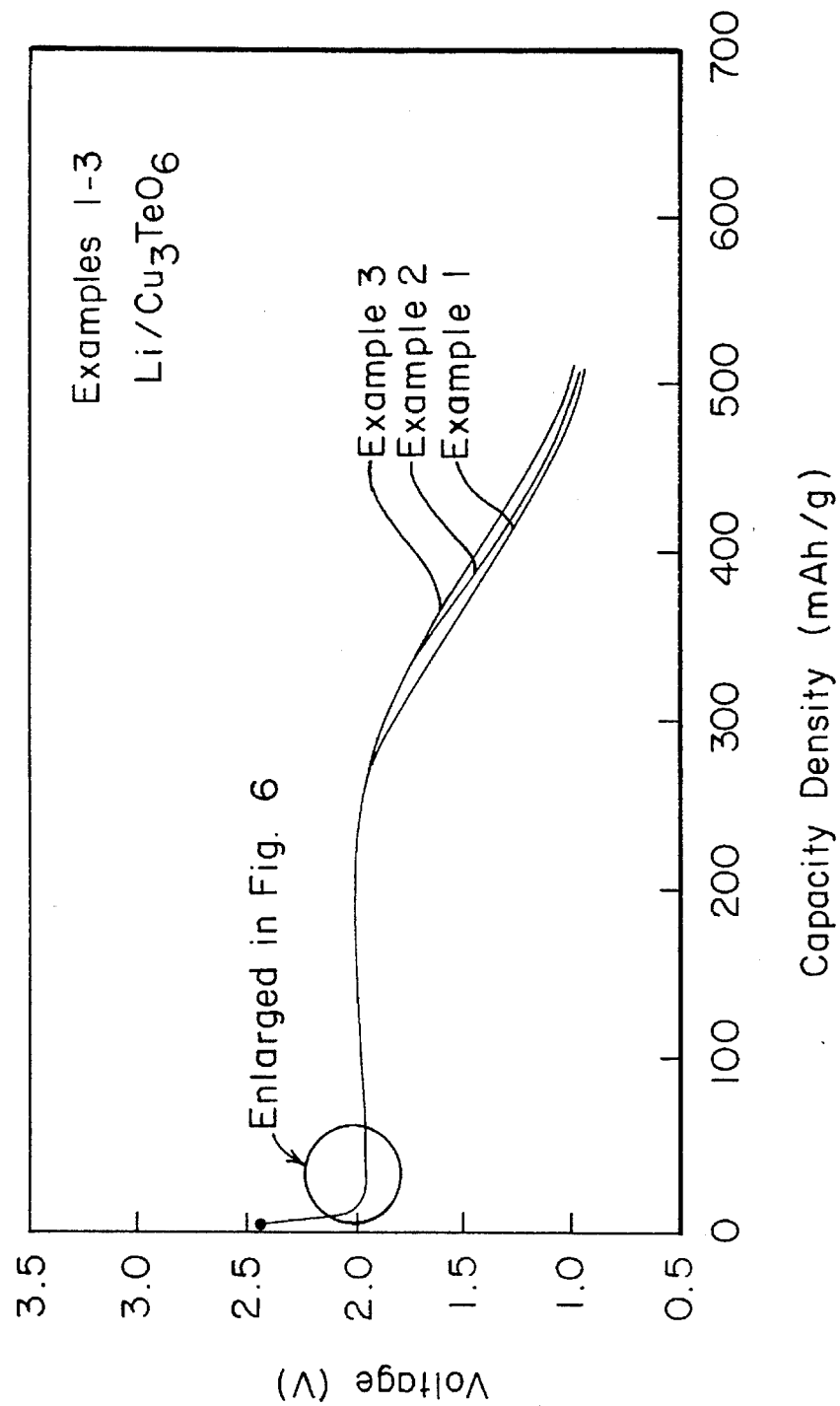
FIG. 3 shows discharge patterns of cells produced in Examples 1 to 3.

When a final discharge voltage of each cell is regarded to be 1.5 V, the capacity density per unit weight of each cell can be determined from the curves as follows:

Examples 1 to 3: 370 to 390 mAh/g (seen from FIGS. 1 to 3)

Figure 4:
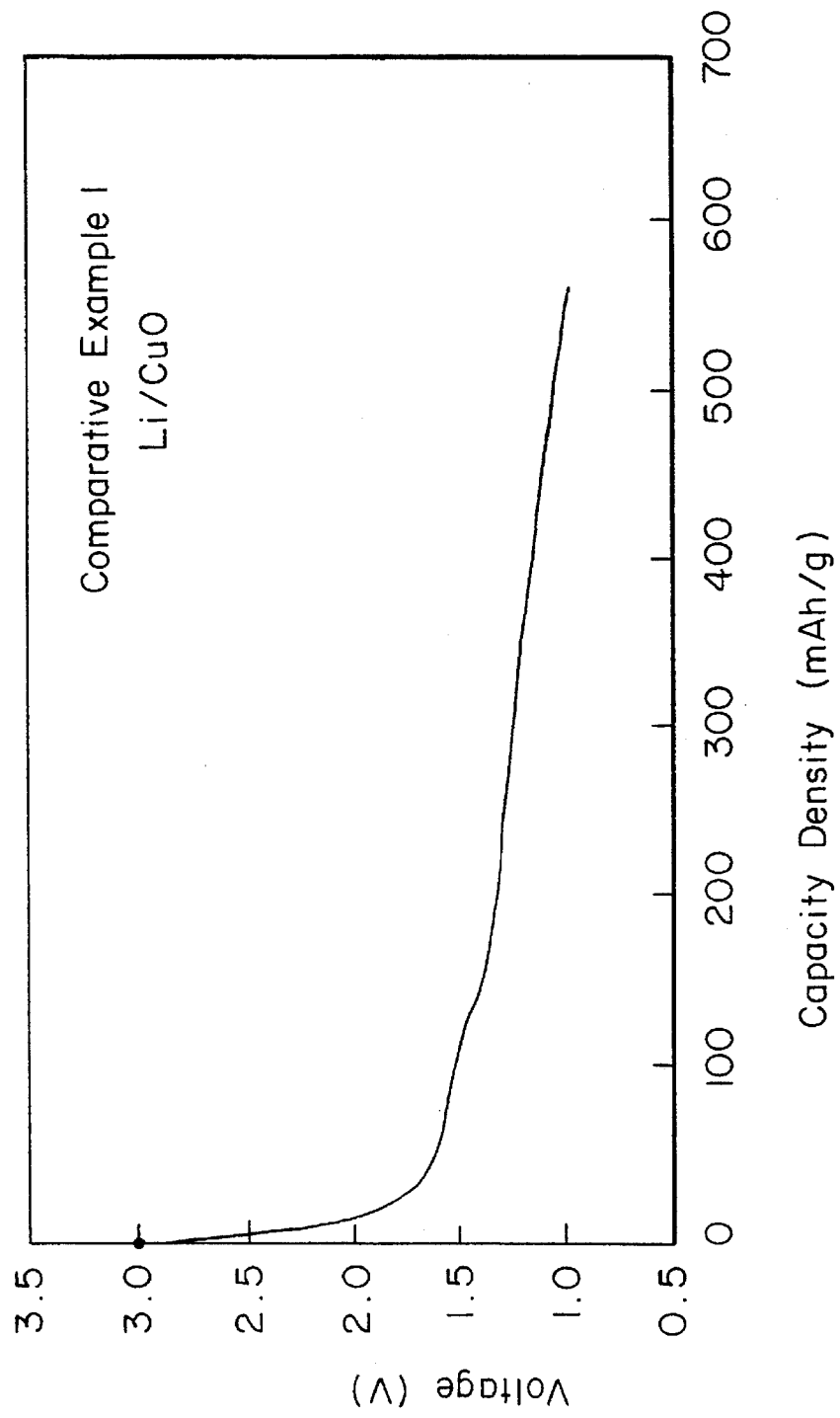
FIG. 4 shows a discharge pattern of a cell produced in Comparative Example 1.

Comparative Example 1: 110 mAh/g (seem from FIG. 4)

Figure 5:
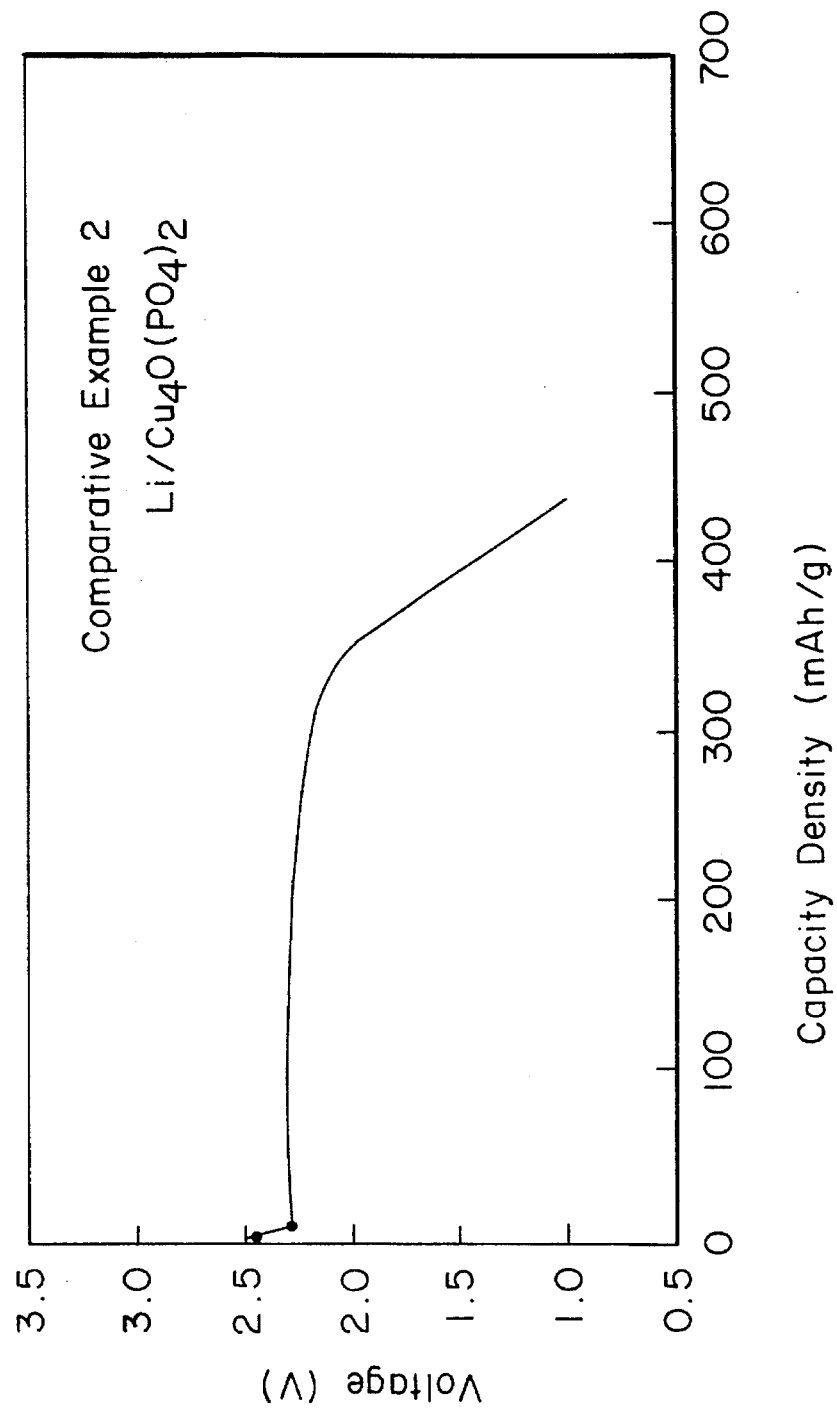
FIG. 5 shows a discharge pattern of a cell produced in Comparative Example 2.

Comparative Example 2: 400 mAh/g (seem from FIG. 5)

When the above results are interpreted in view of the positive electrode active material, the density capacity is 390 mAh/g in the case of $Cu_3TeO_6$ (Example 3), 110 mAh in the case of CuO and 400 mAh/g in the case of $Cu_4O(PO_4)_2$ at the final discharge voltage of 1.5 V.

CuO which provides the low voltage has the small capacity density when the final discharge voltage is set to 1.5 V. However, the cell of the present invention using $Cu_3TeO_6$ has almost the same capacity density per unit weight as that of the cell using $Cu_4O(PO_4)_2$.

A specific gravity of $Cu_3TeO_6$ is 6.34 g/cm³ and a specific gravity of $Cu_4O(PO_4)_2$ is 4.54 g/cm³. Thus, a capacity density per unit volume is 2400 mAh/cm³ in the case of $Cu_3TeO_6$ while 1900 mAh/cm³ in the case of $Cu_4O(PO_4)_2$. On the basis of the capacity density per unit volume, $Cu_3TeO_6$ can provide a larger density capacity than $Cu_4O(PO_4)_2$.

Practically, a commercially available cell is required to have a standard size, and thus, an inner volume of the cell which is filled with an active material and so on is limited. Therefore, in order to make the cell having a large capacity, it is required for the active material to have a large capacity density per unit volume, and thus, it is contemplated that the copper compound oxide such as $Cu_3TeO_6$ is an extremely effective material.

Especially, in a cell of which inner volume is limited to less than 5 cm³, it is preferable that a material having a density capacity not less than 2000 mAh/cm³ such as $Cu_3TeO_6$ is used in order to have an overall capacity density of the cell not less than 250 mAh/cm³.

Figure 6:
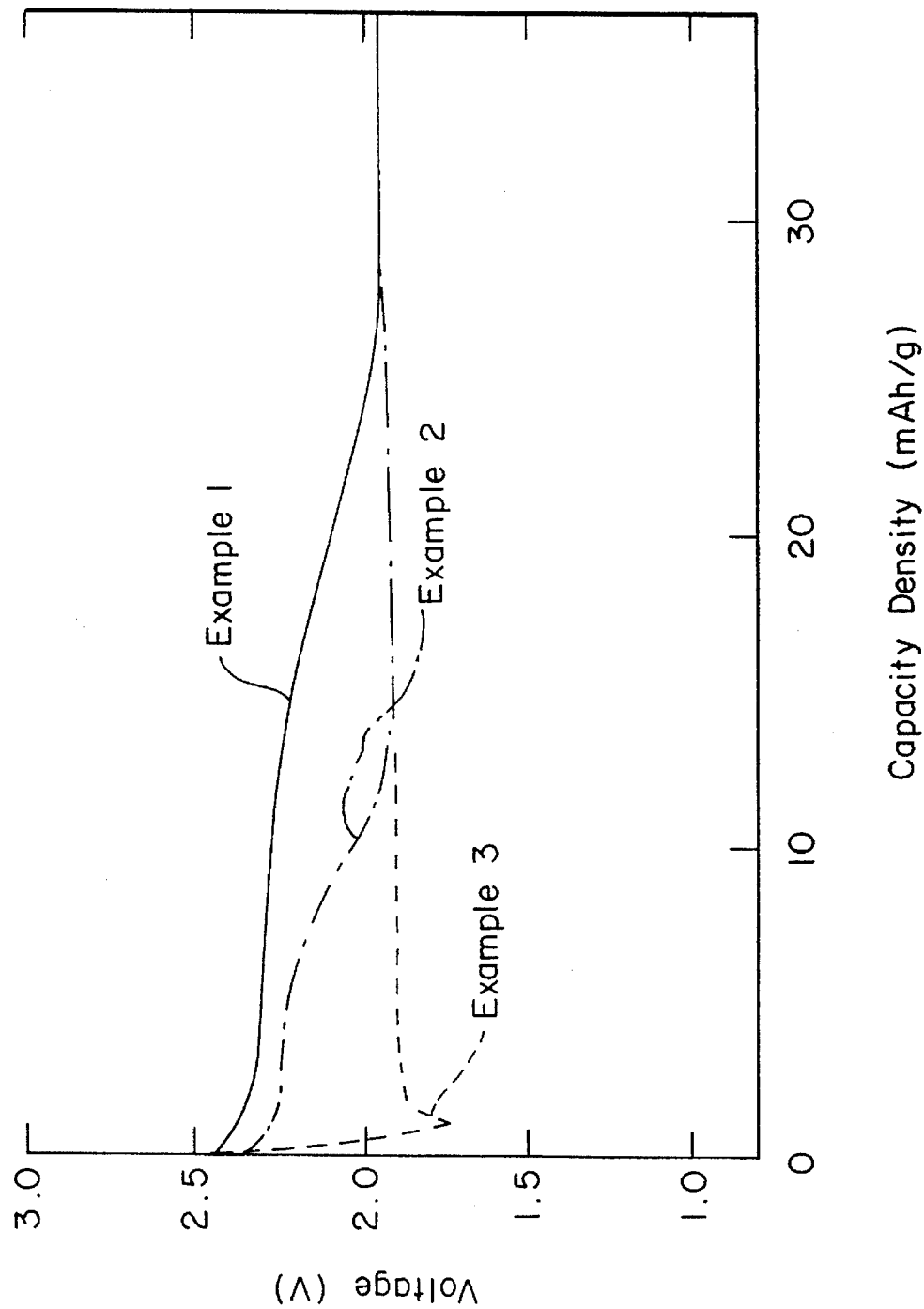
FIG. 6 shows a graph in which an initial portion of the patterns of FIG. 3 is enlarged.

As clearly seen from FIG. 6, which shows enlarged curves of FIG. 3 during the initial discharge period, the cell produced in Example 3 by using solely the positive electrode active main material comprising $Cu_3TeO_6$ as the main component, showed the discharge voltage lowering during the initial period from the beginning in which period about 10% of the total discharge capacity was discharged. In particular, the voltage was lowered to near 1.7 V at the beginning of the discharge.

To the contrary, the cell produced in Example 1 by using the positive electrode active main material comprising $Cu_3TeO_6$ as the main component mixed with 15% by weight of the additive material did not show the voltage lowering as seen in the cell of Example 3, but showed an almost flat discharge curve.

Also the cell produced in Example 2 by using the positive electrode active main material comprising $Cu_3TeO_6$ as the main component mixed with 15% by weight of the additive material did not show the voltage lowering as seen in the cell of Example 3, but showed an almost flat discharge curve.

For an application where an discharge current above 1 mA/cm² is used or an application at a temperature of below 0° C., since the voltage lowering is likely to occur, the additive material is preferably added in an amount of 10 to 30% by weight, as in the case of Example 1, on the basis of the mixture of the positive electrode active main material and the additive material. For the other applications, the amount of the additive material to be added of 2 to 10% by weight is sufficient.

An amount of the electrolytic solution provided in the cell is preferably so controlled that the ratio of the volume of the electrolytic solution (μl) to the discharge capacity of the positive electrode active material (mAh), namely (μl/mAh), is in a range of 0.8 to 1.5.

In order to produce a pellet having a large density using a material of which density is as large as above 6 g/cm³, the electron conductive aid to be added in the positive electrode composition is preferably in a range of 2 to 25% by weight of the composition. The amount of the binder is preferably in a range of 0.2 to 5% by weight based on the composition. The amount of the electron conductive aid is determined by electron conductive properties and surface conditions of the positive electrode active main material which comprises $Cu_3TeO_6$ as the main component according to the present invention. The amount of the binder is optimally selected depending on a specific gravity and a particle size of the positive electrode active main material.

In a practical cell, it is preferable that the amount of Li of the negative electrode be so limited that it is less than an amount which corresponds to the discharge capacity of the positive electrode, namely, a negative electrode limited cell. It is because hexavalent tellurium may be converted to a smaller valent tellurium due to a reaction with Li, and such a smaller valent tellurium may adversely affect storage properties due to, for example, a reaction with an electrolytic solution. $Cu_3TeO_6$ has a flat voltage region of about 2 V above that of Li which voltage is gradually lowered to near 1 V thereafter. It is preferable that the amount of Li of the negative electrode be limited to an amount which corresponds to the capacity of only the flat region and that Li does not react with the positive electrode thereafter.

As explained above, according to the present invention, a lithium cell is provides which provide high voltage and a large capacity density.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lithium cell comprising a negative electrode comprising lithium or a lithium containing material, an electrolytic solution based on an organic solvent, and a positive electrode active material comprising a copper compound oxide, having an atomic ratio of at least 1 of a number of lithium atoms (Li) which react with one molecule of said copper compound oxide during discharge of said lithium cell to a number of oxygen atoms (O) contained in one molecule of said copper compound oxide, which ratio is expressed as Li/O, wherein said copper compound oxide comprises copper, tellurium and oxygen.

2. The lithium cell according to claim 1, wherein said copper compound oxide is $Cu_3TeO_6$.

3. A lithium cell comprising a negative electrode comprising lithium or a lithium containing material, an electrolytic solution based on an organic solvent, and a positive electrode active material comprising a copper compound oxide, having an atomic ratio of at least 1 of a number of lithium atoms (Li) which react with one molecule of said copper compound oxide during discharge of said lithium cell to a number of oxygen atoms (O) contained in one molecule of said copper compound oxide, which ratio is expressed as Li/O, wherein said copper compound oxide comprises at least one member selected from the group consisting of $Cu_3TiO_4$, $Cu_3WO_6$, $Cu_3TiO_5$, and $Cu_2MgO_3$.

* * * * *